(12) United States Patent
Hulse (10) Patent No.: US 6,728,038 B2
(45) Date of Patent: Apr. 27, 2004

(54) LOW CHROMATIC DISPERSION FILTER FOR WDM

(75) Inventor: Charles Andrew Hulse, Sebastopol, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/227,844

(22) Filed: Aug. 27, 2002

(65) Prior Publication Data

US 2003/0048537 A1 Mar. 13, 2003

Related U.S. Application Data

(60) Provisional application No. 60/315,344, filed on Aug. 29, 2001.

(51) Int. Cl.[7] .............................. G02B 5/28; H04J 14/02
(52) U.S. Cl. ....................... 359/590; 359/588; 359/589; 359/900; 398/83; 398/85
(58) Field of Search ........................ 359/590, 900, 359/359, 586, 588, 589; 398/79, 81, 82, 83, 85

(56) References Cited

U.S. PATENT DOCUMENTS

| | | | |
|---|---|---|---|
| 5,734,503 A | 3/1998 | Szipocs et al. ............ 359/584 |
| 6,081,379 A | 6/2000 | Austin et al. .............. 359/584 |
| 6,154,318 A | 11/2000 | Austin et al. .............. 359/584 |
| 6,222,673 B1 | 4/2001 | Austin et al. .............. 359/584 |
| 6,301,042 B1 | 10/2001 | Pelekhaty .................. 359/359 |
| 6,301,049 B1 | 10/2001 | Kärtner et al. ............. 359/588 |
| 6,631,246 B2 * | 10/2003 | Ford et al. ................. 398/158 |
| 2003/0087121 A1 * | 5/2003 | Domash et al. ............. 428/641 |
| 2003/0099019 A1 * | 5/2003 | Zhang et al. ............... 359/161 |

OTHER PUBLICATIONS

M. Jablonski, et al., "The Realization of All–Pass Filters for Third–Order Dispersion Compensation in Ultrafast Optical Fiber Transmission Systems", J. Lightwave Technology, vol. 19, No. 8, Aug. 2001, pp. 1194–1205.*
G. Lenz, et al., "General Optical All–Pass Filter Structures for Dispersion Control in WDM Systems", J. Lightwave Techn., vol. 17, No. 7, Jul. 1999, pp. 1248–1254.*
C.K. Madsen, et al., "A Tunable DIspersion Compensating MEMS All–Pass Filter", IEEE Photonics. Tech. Lett., vol. 12, No. 6, Jun. 2000, pp. 651–653.*
A.A.M. Saleh, et al., "Two–Stage Fabry–Perot Filters as Demultiplexers in Optical FDMA LAN's", J. Lightwave Techn., vol. 7, No. 2, Feb. 1989, pp. 323–330.*

* cited by examiner

*Primary Examiner*—John Juba, Jr.
(74) *Attorney, Agent, or Firm*—Allen, Dyer, Doppelt, Milbrath & Gilchrist, P.A.

(57) ABSTRACT

A narrow bandpass optical filter for use in a WDM communication minimizes the system bit rate error by providing a sufficiently broad passband with respect to the data transfer rate yet has a low group delay across the passband. The passband shape is optimized to have a single maximum in the center of the passband and continuously decreasing transmission there from so as to minimize dispersion in GD across the passband.

9 Claims, 7 Drawing Sheets

LOW CHROMATIC DISPERSION FILTER FOR WDM

CROSS REFERENCE TO RELATED APPLICATIONS

The present application claims priority to provisional application having serial No. 60/315,344 entitled "Low Chromatic Dispersion Filter for WDM" filed on Aug. 29, 2001, which is incorporated herein by reference.

BACKGROUND OF INVENTION

The present invention relates to components for optical communications systems, specifically multilayer optical interference filters used in interconnection and coupling devices.

Optical communications systems comprise an interconnected network of optical fibers for transmitting a plurality of the optical signal channels between nodes in the network. In order to increase the capacity of existing optical communications systems, or provide for flexible reconfiguration, multiple optical signal channels may propagate between nodes simultaneously using time division and wavelength division multiplexing (WDM).

Wavelength division multiplexing refers to a plurality of signal channels characterized by a different wavelength of light, while time division multiplexing refers to a time sequence allocation of digital signals within a common optical signal channel. Although information may be transmitted in analog format in a WDM system, the digital format is commonly used in telecommunications because of the higher data transfer rates and compatibility with time division multiplexing schemes deployed in electronic communications systems.

As a WDM communication system utilizes optical signals of different wavelengths the optical fiber network must be configured such that the time sequential nature of information traveling on different wavelengths between common nodes is not temporally distorted. While such temporal distortion is influenced by design and environmental factors, it is frequently due to the wavelength dependence of the refractive index within the optical media forming the waveguiding optical fiber. The velocity of light is decreased on transmission through a dense media, such as optical glass fibers, in proportion to the refractive index ratio between free space transmission, 1, and the refractive index of the optical glass at the signal channel wavelength $n_g$. As a refractive index of glasses vary with wavelength, $\lambda$, (i.e. $n_g = n(\lambda)$) optical signals will be distorted, that is distributed in arrival time at the terminal node in the communication system network in proportion to the distance between originating node and the terminal node. The change in refractive index of a material with wavelength is commonly referred to as chromatic dispersion. Thus, as the distance between nodes in the optical communication system increases, or the digital pulse width decreases in order to obtain greater signal transfer capacity, the inherent properties of optical glasses become a greater limitation on performance and reliability.

Chromatic dispersion of optical fiber is roughly constant over the 1550 nm communication window, and can be compensated by several techniques including dispersion compensating fiber, which has a radial gradient in refractive index to provide self correction, Fiber Bragg gratings, etc. However, certain wavelength filtering components such as multilayer interference filters (MLIF) can have significant dispersion characteristics due to a fundamental Kramers-Kronig type relationship between transmission spectrum and dispersion characteristics. This type of temporal distortion is also quantified as the group delay (GD), typically in units of pico-seconds (ps). As the GD characteristic varies substantially with wavelength over the narrow passband (that is the high transmission region corresponding to the allocation of signal channels at specific wavelength per ITU convention) of an MLIF, the derivative of GD with respect to wavelength is also denominated or characterized as the dispersion, typically in units of ps/nm (pico-seconds/nano-meter). Such dispersion is difficult to compensate using conventional techniques such as dispersion compensating fiber.

Other sources of signal temporal distortion may arise for various active or passive components within the optical communication network, such as optical amplifiers, multiplexing filters, gain flattening filters, arrayed waveguides, Fiber Bragg gratings and the like, as well as temperature fluctuations. Accordingly, as an optical communication system is reconfigured for repair, maintenance or to meet changes in demand, the temporal distortion of signals may change in a manner that is not easily predictable. Numerous methods providing for the effects of GD, whether arising through the characteristics of the optical fiber or system components, have been developed. These methods include devices that either provide a fixed amount of compensation or an adjustable amount of compensation, or may be deployed at or between nodes in the optical communication system.

Reflective MLIF's that provide dispersion or group delay compensation have been disclosed in U.S. Pat. Nos. 5,734,503; 6,301,049; 6,301,042; 6,222,673; 6,154,318 and 6,081,379, which are incorporated herein by reference. However, these solutions are inapplicable to a WDM system as they do not provide for single channel compensation and/or attenuate or reject the other optical signals that are not intended to be compensated. These thin film design approaches all achieve the desired group delay or dispersion control on reflection from dielectric stacks wherein the optical thickness of the quarterwave layers is perturbed to improve the group delay over the reflective stacks bandwidth. These filter designs are inapplicable not only when the modification of only a narrow bandwidth is desired, but also do not generally provide the level of GD or dispersion correction required in an optical communication system.

As new interconnections are required to insert such devices within the optical communication system it is desirable that the devices themselves, as well as the connections thereto, result in a minimum signal loss.

Accordingly, it is an objective of the invention system to provide a narrow bandpass filter that avoids the need for significant correction of group delay or dispersion correction.

It would be advantageous to provide narrow bandpass filters which achieved comparable isolation and high transmission of optical signals, while avoiding signal loss, crosstalk and other bit rate errors without compromising the ability to space optical signal channels as close as possible; that is within the limits of source laser and modulator performance.

It is a further object of the invention to provide suitable narrow bandpass filter devices are simple to fabricate, compact and thermally stable.

SUMMARY OF INVENTION

The inventive narrow bandpass filters have an optimized transmission profile for use in high bit rate communication systems where the variation in GD across the filter bandwidth would otherwise result in unacceptable bit error rates absent addition means for dispersion compensation.

The inventive filters deliberately do not follow the conventional practice of optimizing the bandpass region to have a "square" profile with a relatively flat region of high transmission surrounding the center wavelength position of the filter. While the conventional design approach avoids signal loss arising from laser source instability, it is now appreciated that at higher bit rates the resultant "noise" arising from the high dispersion in GD across the passband is dominant contributor to the bit error rate in the system.

The first object is achieved by providing a Fabry-Perot (F-P) type MLIF having a transmission and GD dispersion optimized to provide a more consistent signal to noise ration with laser or source instability such that the overall bit error rate is reduced at high bit rates. The optimized narrow bandpass filter is characterized by a high transmission at its center wavelength position and a gradually decreasing transmission across the remainder of the bandwidth. By selecting and arranging the layers of the F-P MLIF to obtain this result the wavelength variation in group delay, or dispersion, generally thought to be inherent in a narrow bandpass filter is substantially constant over the most significant region of the filters passband.

Another object of the invention is achieved by selecting and arranging the layers of the F-P MLIF to provide a 3 dB bandwidth in transmission over which the maximum ripple in group delay is determined by the optical channel spacing, 3 dB bandwidth and the bit rate of the communication system.

The above and other objects, effects, features, and advantages of the present invention will become more apparent from the following description of the embodiments thereof taken in conjunction with the accompanying drawings.

DETAILED DESCRIPTION

The structure and function of the various embodiments of the invention is best understood in reference to the construction of a multiple layer interference filter used in wavelength division multiplexing (WDM) application. The term multiple layer interference filter (MLIF) refers to an optical device that filters transmitted or reflected light by wavelength selective interference as they are constructed from multiplicity of optically coupled layers having different optical properties. Such filters are useful in separating and combining optical signals transmitted on common optical waveguides at a slightly different wavelength to increase the overall data transmission capacity, as they do so with minimum signal loss or attenuation. The filters commonly deployed in WDM systems are also described as narrow bandpass filters, as they exhibit a narrow wavelength region of high transmission, the bandpass, with adjacent wavelength regions being highly reflective to reject wavelengths corresponding to adjacent optical signal channels.

In summary, a MLIF comprises dielectric materials that provide alternating layers of the high and low refractive index so that the light is partially reflected at the each such interface. As the wavelength of the reflected light is determined by the optical thickness of the layers, the overall transmission and reflection characteristics are wavelength dependent due to selective interference. The thickness of these layers is generally selected to have an optical path length of about a quarter wavelength, with the thickness and order of the layers being varied to achieve the desired filter characteristics as a function of wavelength.

The classic F-P structure is the simplest interference structure, as it minimally requires 2 layers that are at least partially reflective. It can generically be described as a pair of optically spaced reflective surface wherein the optical path difference results in the wavelength selective interference characteristics.

The generic F-P structure can be combined or constructed from different MLIF's as the reflective surfaces can be formed from dielectric materials, so that the reflectors partially reflect and transmit in differing proportions over specific wavelengths. Additionally, optical spacers of the same or different dielectric materials can separate these dielectric reflectors. The dielectric reflector is primarily constructed from high and low refractive index materials having an optical thickness of a quarter wavelength, the reference wavelength being the center wavelength position of the reflective region, or stop band, of the dielectric reflector. However, in a bandpass filter the spacer layer optical thickness is one or more integer multiples of the half the reference wavelength.

Figure 1:
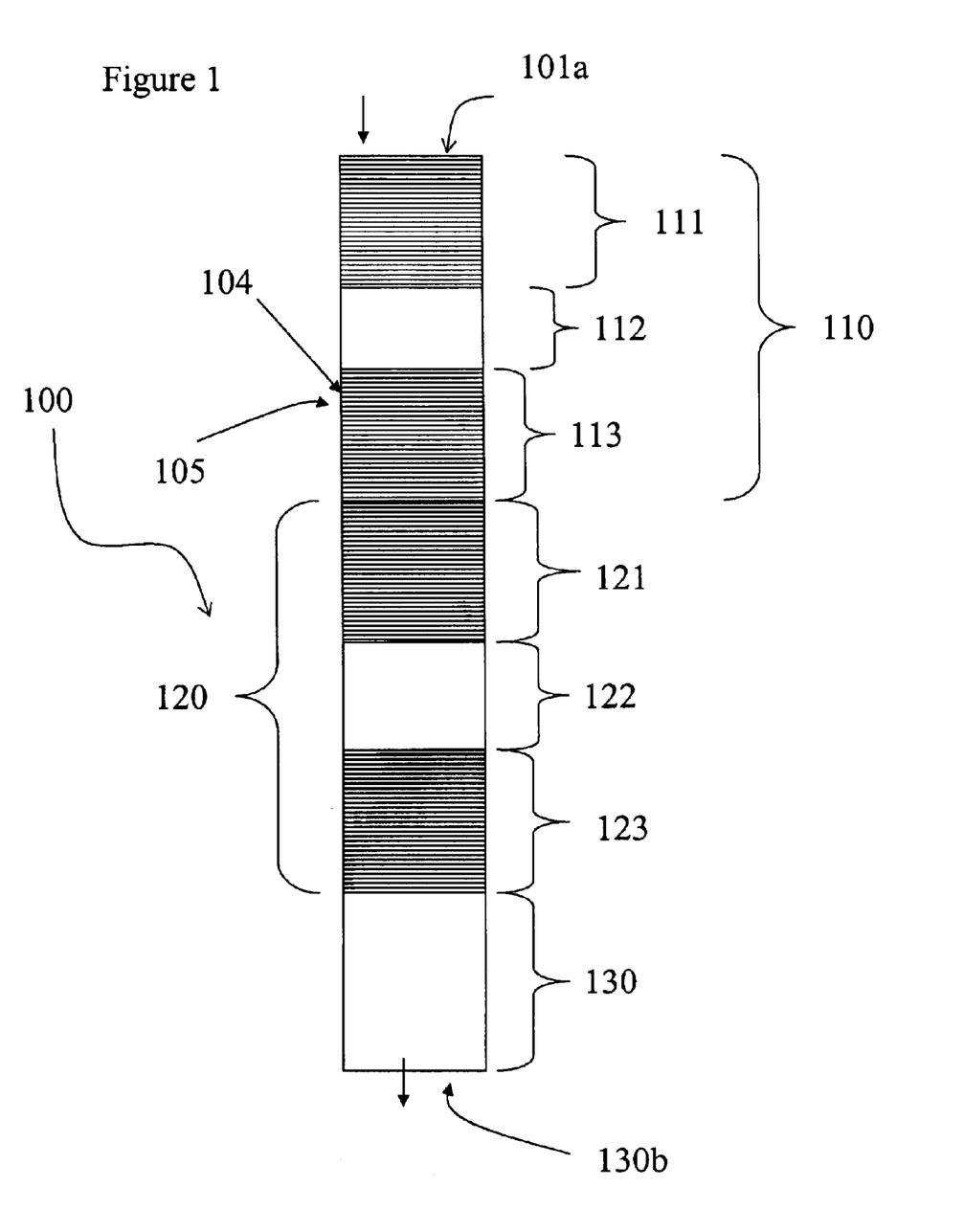
FIG. 1 is a cross-section of a narrow band pass filter illustrating the structure of the multiple thin film layers.

Such an exemplary narrow band pass filter 100 is illustrated in cross section in FIG. 1. When the filter is used in transmission incident radiation can arrive from either the front surface 101a (as shown by the arrow) or rear surface, 130b. The first optical cavity 110 comprises a pair of reflector layers 111 and 113 surrounding the associated spacer 112. The reflectors comprise multiple pairs of dielectric layers of alternating high and low refractive index, such as high refractive index layer 104 and low refractive index layer 105. The second optical cavity 120 comprises pairs of dielectric reflector layers 121 and 123 surrounding the associated spacer layer 122. Reflectors 121 and 123 also comprise multiple pairs of dielectric layers of alternating high and low refractive index. These various thin film layers are preferably deposited in sequence onto a transparent substrate 130, however the substrate can also be removed, if for example the MLIF is attached to another supporting structure.

Although only two cavities are shown such filters frequently deploy three or more optical cavities in order to narrow and refine the shape of the passband region to a "square" profile in order to more fully isolate the adjacent optical signal channels, thus preventing cross-talk and attenuation.

However, such optimization of the passband shape with an increased channel density, that is closer channel spacing, can compromise overall system performance and reliability as it results in a higher bit error rate, particularly at higher bit rates, particularly beyond about 20 GB/sec. The higher bit error rates appear to arise from the uncompensated effects of the group delay characteristics of the filter, which occurs as selected wavelengths are trapped within each optical cavity, which causes inconsistent temporal distortion of digital pulses with laser source instability within the allocated optical signal position on the ITU grid.

Figure 2:
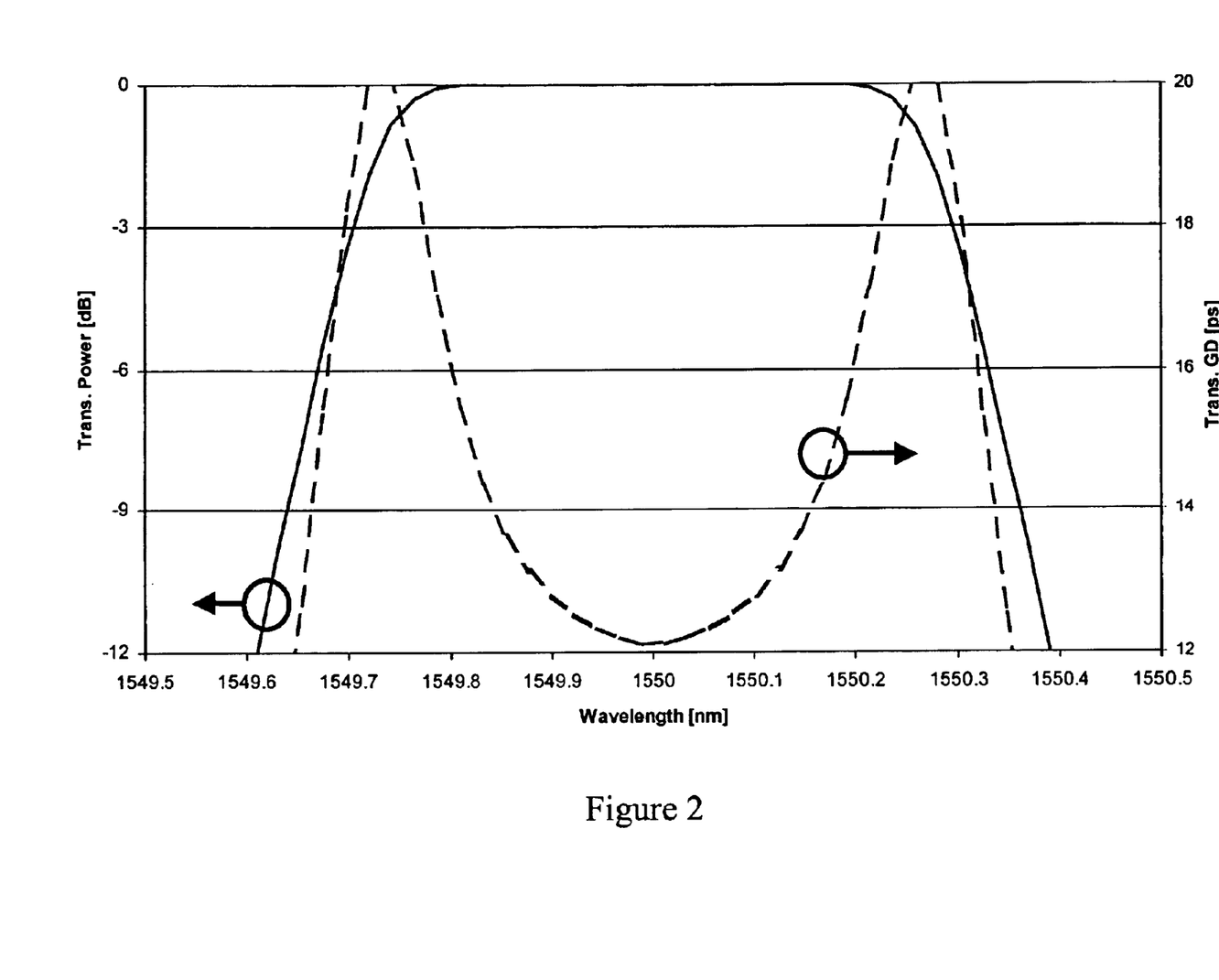
FIG. 2 is a plot showing the wavelength dependence of the signal attenuation in transmission, in dB and group delay, in pico-seconds, for the bandpass filter design in Table 1.

Turning to FIG. 2, the wavelength dependence of the group delay, in pico-seconds, and attenuation in transmission, in dB, are illustrated for narrow bandpass filter having a 100 GHz. bandwidth (210) in Table 1. The passband shape was optimized to a "square profile" with minimum ripple utilizing 4 optical cavities according to the optical design parameters in Table I. The optical parameters of the constituents of each optical cavity are provided wherein the optical thickness of each spacer is in nm, the reflectivity of the surrounding dielectric reflectors is specified in % reflection (R[%]) and their quarterwave optical thickness (R qwot) is expressed in nm.

This filter has two discrete maxima in GD within the passband region that is separated by a local minimum in GD at the bandpass center wavelength. Thus the filter exhibits significant dispersion, or change in GD with wavelength.

TABLE I

100 GHz "Square-top" filter

| Cavity # | Cavity Optical Thickness [nm] | R [%] | R qwot [nm] |
|---|---|---|---|
| 1 | 6975 | 97.40 | 1550 |
| 2 | 6200 | 98.62 | 1550 |
| 3 | 6200 | 98.62 | 1550 |
| 4 | 6975 | 97.40 | 1550 |

Figure 3:
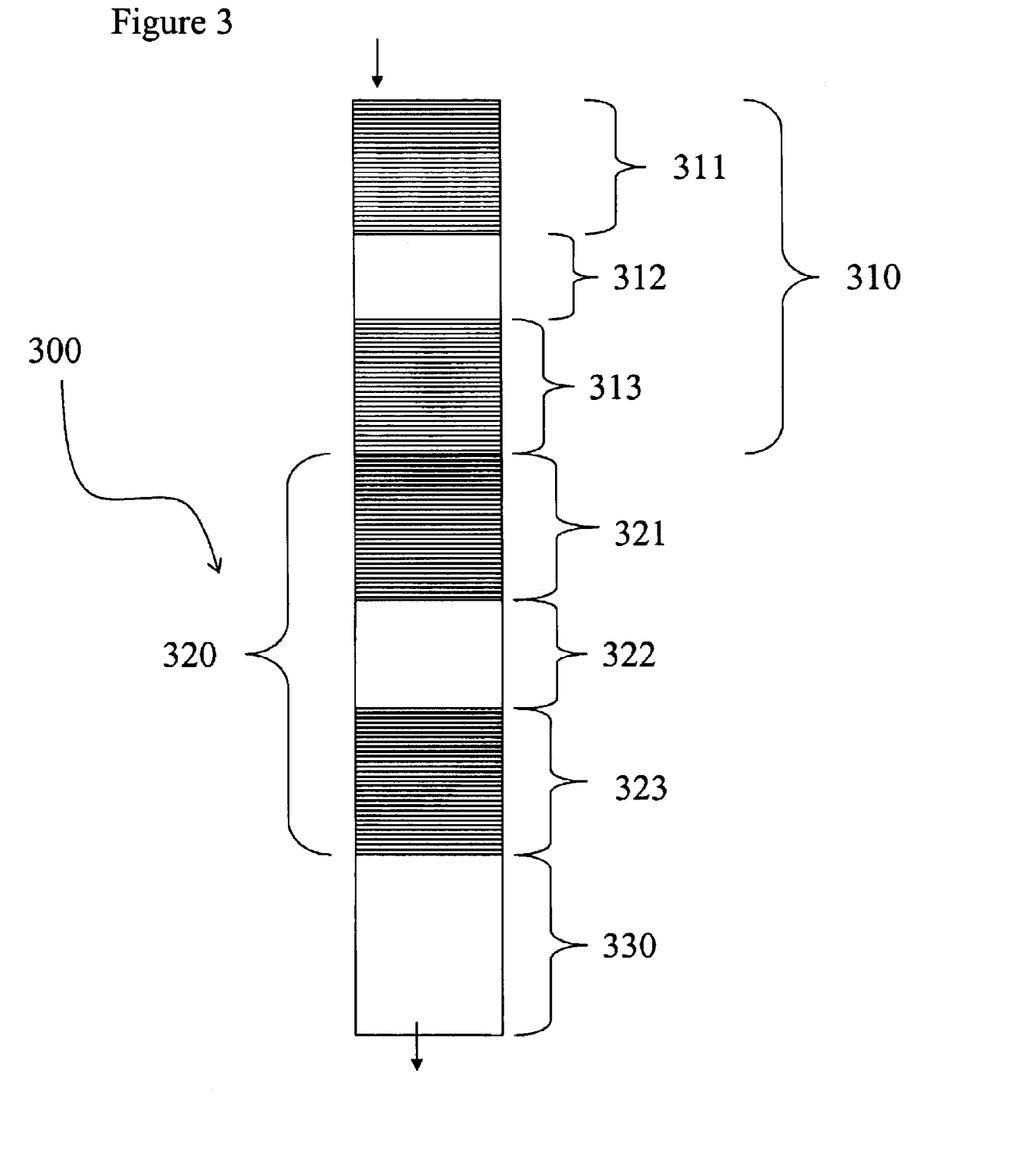
FIG. 3 is a cross-section of an embodiment of a low dispersion narrow bandpass filter illustrating the multiple thin film layers.

FIG. 3 is a cross-section illustrating a first embodiment of the dc filter capable of providing low dispersion in GD across a narrow bandwidth. As in FIG. 1 this narrow bandpass filter 300 comprises two or more optical cavities 310 and 320, each having spacers 312 and 322 respectively. An identical pair of dielectric reflectors 311 and 313 surrounds each of spacers 312 and 322 for spacer 312; 321 and 323 around spacer 322. These various thin film layers are preferably deposited in sequence onto a transparent substrate 330, however the substrate can also be removed, if for example the MLIF is attached to another supporting structure.

The dielectric reflector pairs surrounding each spacer while being partially reflective and partially transmissive are generally not identical. The optical cavity may comprise the same, different or combinations of dielectric materials used to form any of the surrounding dielectric reflector layers.

Additionally, the optical cavities forming the F-P structures in the narrow passband filter may comprise multiple cavities of different materials and/or thickness depending on the desired range and value of the wavelength dependent group delay. The spacer can be a thin film, that is have a thickness less than 200 microns, allowing all the layers to be deposited by well known optical coating methods. Additionally, one or more spacers can be etalons, that is macroscopic spacers having a physical thickness greater than about 200 microns, so as to have a more closely spaced passbands, depending on the etalon thickness. Accordingly, the design and operating principles that follow are further described below.

Figure 4:
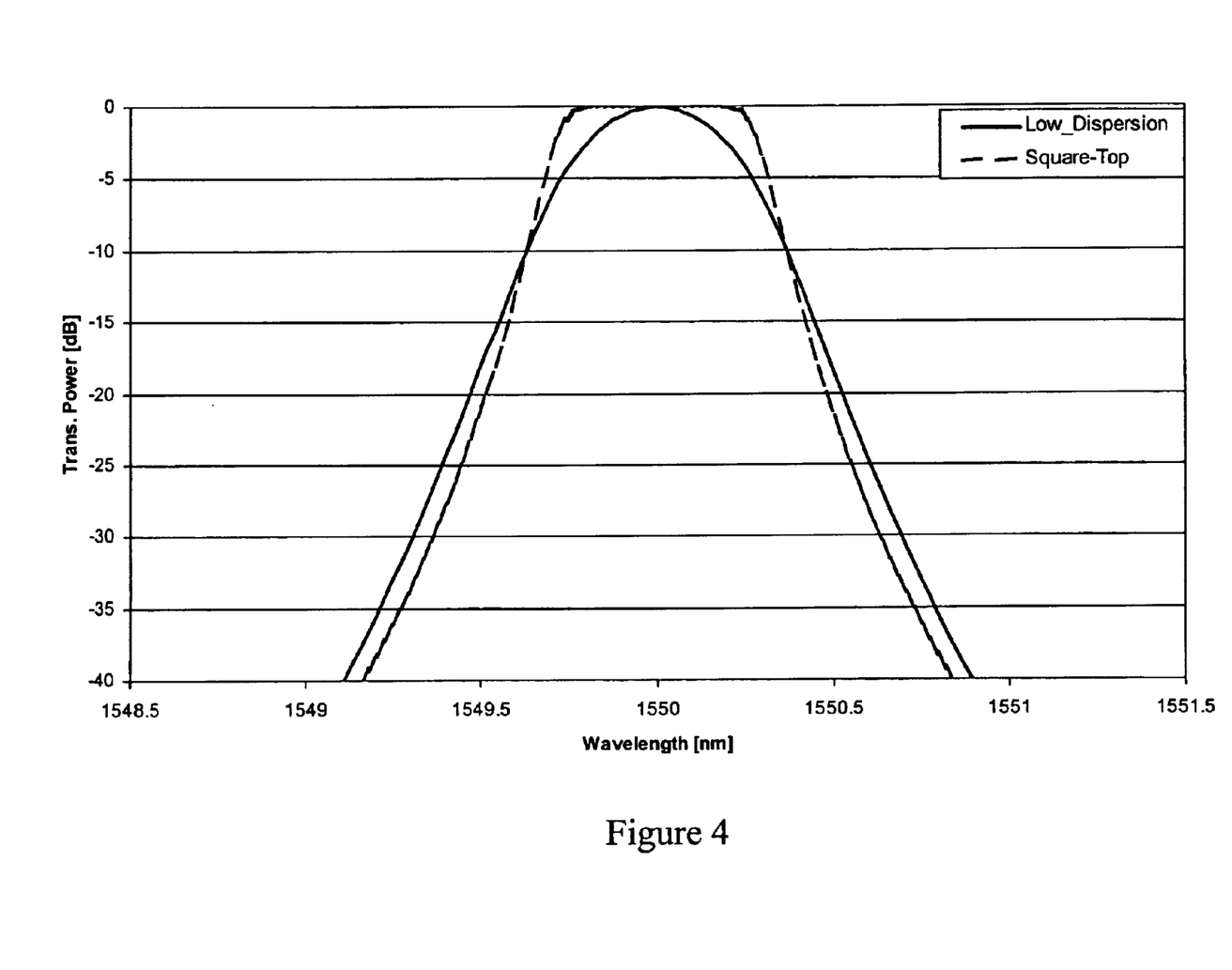
FIG. 4 is a plot comparing the wavelength dependent attenuation in transmission of the inventive low dispersion filter of FIG. 3, according to the optical design parameters of Table II, against the conventional or "square top" filter of FIG. 1, constructed according to the optical design parameters of Table I.

FIG. 4 is a plot comparing the wavelength dependent attenuation of the inventive low dispersion filter of FIGS. 3 and 4 (Table II) against the conventional or "square top" filter in FIGS. 1 and 2 (Table I). As opposed to the transmissive narrow bandpass filter in FIG. 1, the structure, number and order of each optical cavity and the associated dielectric reflectors are selected not to obtain a "square profile" shown in FIG. 1, but the alternative profile as compared in FIG. 4. Thus in the inventive "low dispersion" narrow bandpass filter the transmission gradually increases (that is attenuation in dB decreases) to a maximum value, defining the center wavelength position, then decreases. This design approach avoids both the "square" shaped passband and the nearly flat top of generally high transmission, but with a local variation (not shown), known as "ripple", as the inventive filter has substanially a single rather than multiple local maxima, over the passband region defined by the spacer layers.

Table II provides the optical design parameters for an embodiment of the inventive low dispersion filter in FIG. 4 having 5 optical cavities. The optical parameters of the constituents of each optical cavity are provided wherein the optical thickness of each spacer is in nm, the reflectivity of the surrounding dielectric reflectors is specified in % reflection and their quarterwave optical thickness is expressed in nm.

TABLE II

Low-dispersion Filter

| Cavity # | Cavity Optical Thickness [nm] | R [%] | R qwot [nm] |
|---|---|---|---|
| 1 | 4650 | 95.52 | 1550 |
| 2 | 4650 | 98.20 | 1550 |
| 3 | 4650 | 99.46 | 1550 |
| 4 | 4650 | 98.20 | 1550 |
| 5 | 4650 | 95.52 | 1550 |

Figure 5:
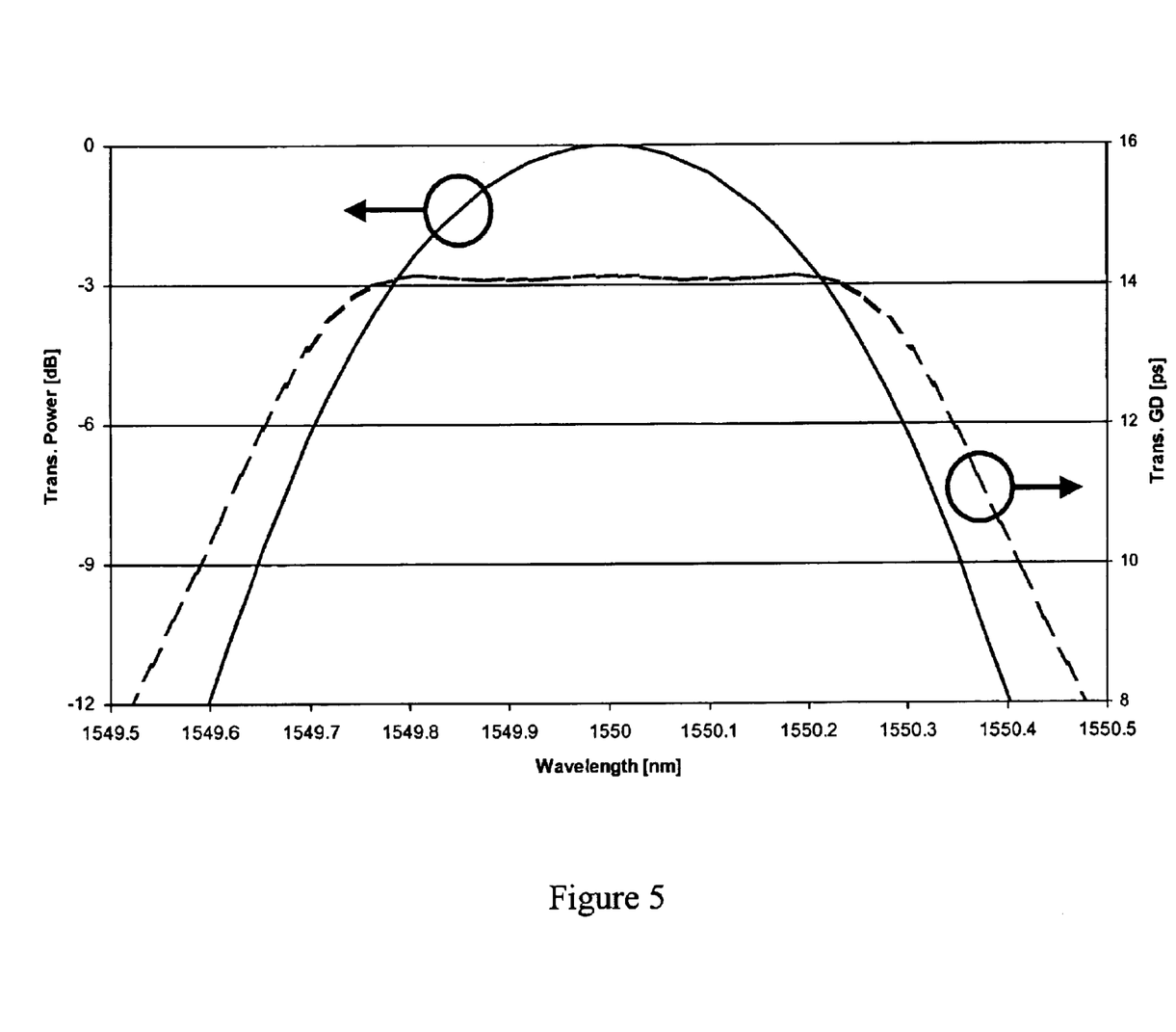
FIG. 5 is a plot showing the wavelength dependent attenuation and group delay of the inventive low dispersion filter of FIG. 3, according to the optical design parameters of Table II.
Figure 6:
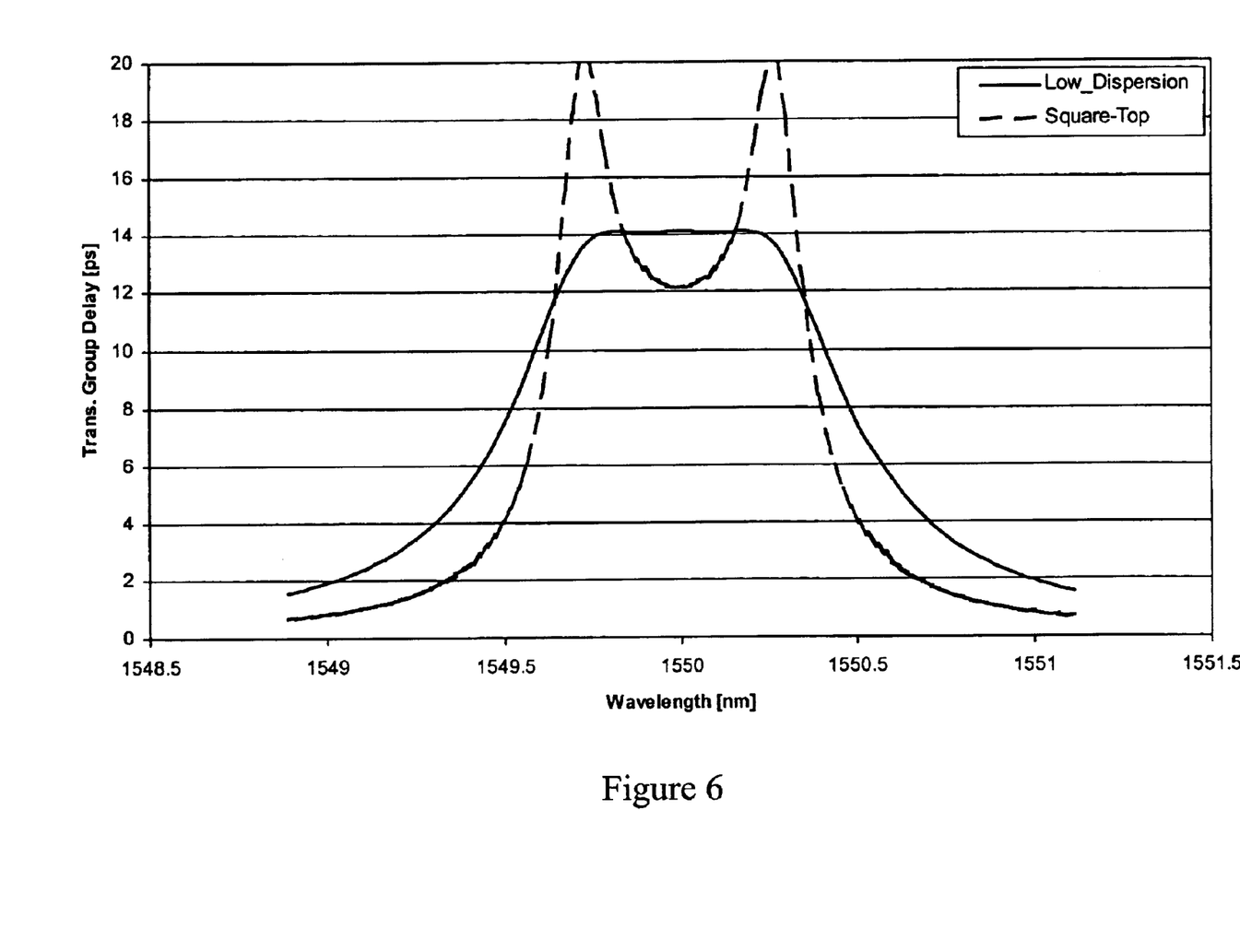
FIG. 6 is a plot comparing the wavelength dependence of GD of the inventive low dispersion filter of FIGS. 3 and 5 (Table II) against the conventional or "square top" filter in FIGS. 1 and 2 (Table I)

FIG. 5 is a plot showing the wavelength dependent attenuation and group delay for the bandpass filter design in Table II of the low dispersion narrow bandpass filter. In contrast to the conventional or "square top" design in FIG. 2 the GD transmission is substantially constant, having a value of about 14 ps over the entire 3 dB bandwidth. The 3 dB bandwidth is the difference in nm between wavelengths at which the transmission decreases by 3 dB, from about 1549.75 nm to about 1550.2 nm, which is about 0.45 nm FIG. 6 is a plot comparing the wavelength dependence of GD of the inventive low dispersion filter of FIGS. 3 and 4 (Table II) against the conventional or "square top" filter in FIGS. 1 and 2 (Table I). While the "square top" filter has a slightly wider 3 dB bandwidth, about 0.6 nm, the GD varies from 12 to greater than 20 ps over this bandwidth, with the greatest variation, that is highest dispersion, occuring at the edge of the passband. The inventive "low dispersion" filter on the other hand has a slightly narrower passband (that is the 3 dB bandwidth is about 0.45 nm or 25% less) but provides a nearly constant GD of about 14 ns over this bandwidth.

A preferred method designing narrow bandpass filters having the inventive characteristics described in reference to FIGS. 4, 5 and 6 is to start with a basic F-P MLIF design and then use a suitably-programmed computer that can refine to the selected combination of performance parameters, as well as calculate the GD as a function of wavelength.

Commercially available software, such as the DWDM TFCalc™/WDM software from Software Spectra™ Inc., of Portland, Oreg. and MACLEOD™ DWDM assistant software available from The Thin Film Center, of Tucson Ariz., are applicable as they offer features and starting designs for creating WDM narrow bandpass filters.

In using such programs one enters a generic description of the design characteristics, such as quarterwave stacks and spacer layers, specifying the materials and refractive index. Next one enters a target performance over the wavelength range of interest. In the case of a narrow bandpass filter this would normally be the maximum transmission, bandwidth and center wavelength position. The program then iteratively adjusts layer thickness, calculates the spectral performance after each iteration in the design, and characterizes each iteration by a goodness of fit criteria. In addition to modifying layers, such programs will insert new layers to refine the design performance to the target values.

However, as the results of a computer optimized design is constrained by the starting design and refinement criteria for the target spectral performance, merely specifying a low GD ripple is insufficient to produce the results described herein, as the refined structure is likely to suffer from an unsuitable compromise in transmission characteristics.

As explained with respect to the spectral performance of a first embodiment of the invention illustrated in FIGS. 2 and 6, the conventional approach to refining a bandpass filter fails to yield an adequate compromise between passband profile and GD dispersion.

Having recognized that a "square" profile has an inherently large dispersion in group delay at the edges of the passband region, the inventive approach starts with a filter spectral transmission profile that has a single maximum at the center of the passband, such as is illustrated in FIG. 5, wherein the attenuation in transmission increases (that is % transmission decreases) continuously from the center wavelength position on both the shorter and longer wavelength sides of the center wavelength position. In the preferred embodiment the transmission profile has either a Gaussian, or near Gaussian shape or the profile of a Bessel-Thompson filter. The Bessel-Thompson filter is used in electric circuits, as described by G. Matthaei, E. M. T. Jones, and L. Young, Microwave Filters, Impedance-Matching Networks, and Coupling Structure (1980, Artech House), which is incorporated herein by reference.

Figure 7:
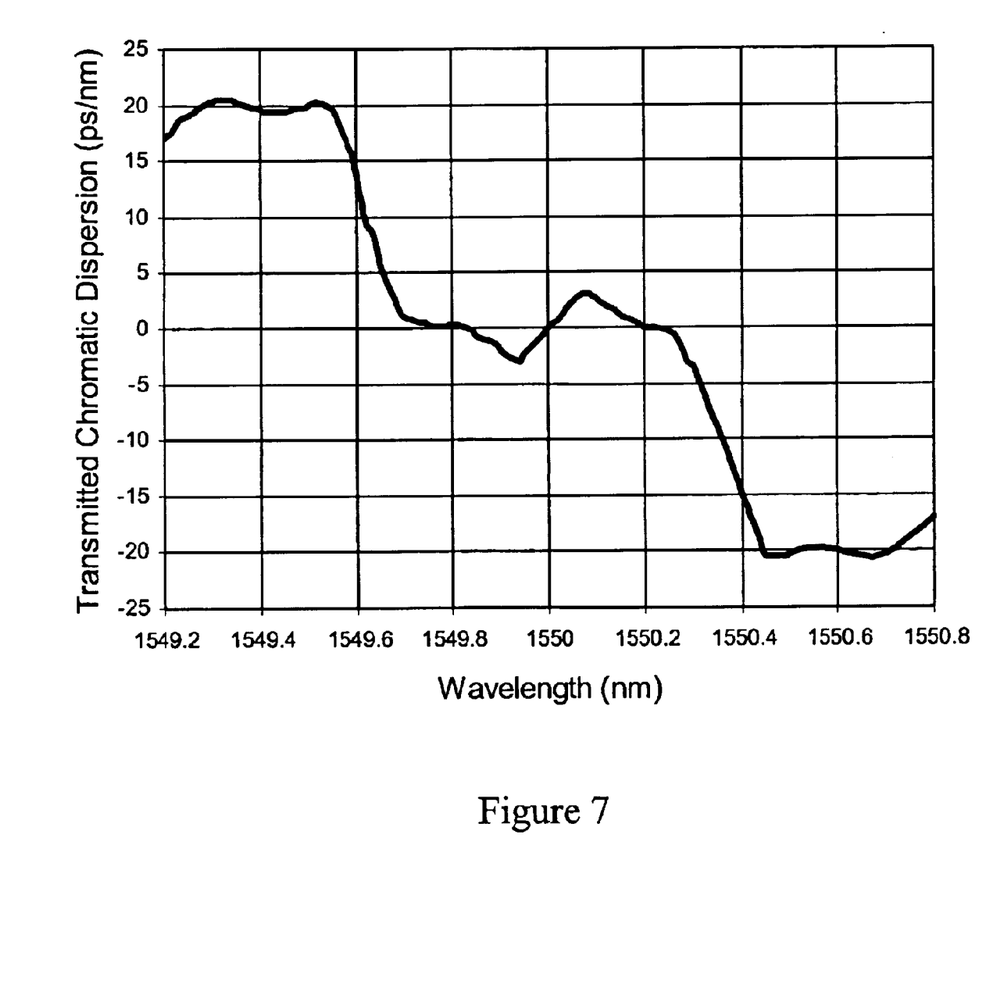
FIG. 7 is a plot showing the theoretical dispersion, dGD ($\lambda$)/d ($\lambda$) as a function of wavelength, $\lambda$, of the inventive low dispersion filter of FIG. 3, according to the optical design parameters of Table II, corresponding to FIG. 5.

This shape produces a nearly constant GD over the 3 dB bandwidth of the filter from about 1549.75 nm to 1550.23 nm in FIG. 5. The ripple in GD, defined as the difference between the minimum and maximum GD within the 3 dB bandwidth, is less than about 0.3 ps, as shown in FIG. 5. As such the dispersion, plotted in FIG. 7, over the 3 dB bandwidth is less than about 4 ps/nm.

In another aspect of the invention such filters can be designed by specifying the center wavelength, transmission at the center wavelength and the group delay profile shown in FIG. 5.

In another embodiment of the invention the overall maximum ripple in GD is minimized with respect to the 3 dB bandwidth, optical channel spacing and for the desired bit rate BR such that the maximum GD ripple is less than:

¼(1/BR)

Additionally, the optical channel spacing and hence width of the passband region must be narrowed as the bit rate increases. The 3 dB BW is preferably less than:

1/BR

Therefore, the maximum in GD ripple is preferably less than:

1/(2×3 dB BW)

Although the preferred embodiment utilizes multicavity F-P structures, the various multipass arrangements disclosed herein enable a plurality of single and at least one multiple cavity F-P structures to be to achieve the same functional performance. It should be appreciated that such configurations may require greater complexity to avoid signal losses at the optical interconnections, most of which are avoided in the monolithic structure in FIG. 3.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A bandpass filter comprising:
    a) a first optical cavity for receiving an optical signal beam, the first optical cavity comprising
        i) a first thin film spacer, and
        ii) a first pair of dielectric reflector stacks surrounding the first thin film spacer to define a first side and a second side; and
    b) a second optical cavity having a first side disposed toward and in optical communication with the second side of said first optical cavity to provide a transmission bandwidth BW defined between the wavelengths at which the transmission decreases by 3 dB, the second optical cavity comprising;
        i) a second thin film spacer, and
        ii) a second pair of dielectric reflector stacks surrounding the second thin film spacer,
    c) wherein the filter characteristic has a transmission T with a single maximum within BW and continuously decreasing transmission across the BW from the maximum, and has a maximum ripple in group delay (GD) over BW less than about 1 ps.

2. A bandpass filter according to claim 1 wherein the transmission decrease over bandwidth BW has a substantially Gaussian filter shape and T is greater than about 90%.

3. A bandpass filter according to claim 1 wherein the transmission decrease over bandwidth BW has a substantially Bessel-Thompson filter shape and T is greater than about 90%.

4. A bandpass filter accordingly to claim 1 and having a single maximum in transmission over a 3 dB BW of less than 1 nm and exhibiting maximum in GD ripple of less than 1/(2×3 dB BW).

5. A narrow bandpass filter having a single maximum in transmission over a 3 dB BW of less than 1 nm and exhibiting a maximum ripple in GD over BW less than about 1 ps.

6. A bandpass filter accordingly to claim 5 exhibiting a maximum ripple in GD over BW of less than about 0.5 ps.

7. A bandpass filter accordingly to claim 1 wherein the physical thickness of each spacer is less than about 200 microns.

8. A bandpass filter accordingly to claim 1 wherein the physical thickness of at least one spacer is more than about 200 microns.

9. A method of combining or separating optical signal channels in a WDM communication system, the method comprising:
   a) providing a plurality of optical signals propagating between one or more common waveguides,
   b) modulating the intensity of the optical channel signals at a bit-rate of BR,
   c) interposing a narrow bandpass multi-layer interference filter to selectively reflect or transmit at least one of the optical channel signals, wherein the narrow bandpass filter has a 3 dB bandwidth BW in which BW is no more than about 2 BR and has a maximum ripple in group delay across BW of less than about 1/(2 BW).

* * * * *